United States Patent
Van Order et al.

[11] Patent Number: 5,546,288
[45] Date of Patent: Aug. 13, 1996

[54] SNAP-IN ELECTRICAL VEHICLE ACCESSORY

[75] Inventors: Kim L. Van Order, Hamilton; Nels R. Smith, Holland, both of Mich.

[73] Assignee: Prince Corporation, Holland, Mich.

[21] Appl. No.: 439,238

[22] Filed: May 11, 1995

[51] Int. Cl.$^6$ ...................................................... B60Q 1/00
[52] U.S. Cl. ........................... 362/74; 362/226; 362/365; 362/457
[58] Field of Search .......................... 362/74, 226, 364, 362/365, 368, 457; 296/214

[56] References Cited

U.S. PATENT DOCUMENTS

| | | | |
|---|---|---|---|
| 3,218,448 | 11/1965 | Cala . | |
| 4,300,188 | 11/1981 | Addario | 362/226 |
| 4,584,631 | 4/1986 | Cody et al. | 362/61 |
| 4,644,612 | 2/1987 | Osterland | 24/295 |
| 4,719,543 | 1/1988 | Collandris et al. | 362/80 |
| 4,831,503 | 5/1989 | DeSantis et al. | 362/80 |
| 4,845,601 | 7/1989 | Podbury et al. | 362/125 |
| 5,186,517 | 2/1993 | Gilmore et al. | 296/214 |
| 5,239,449 | 8/1993 | Wnuk et al. | 362/80 |
| 5,329,429 | 7/1994 | Mathias et al. | 362/74 |
| 5,345,372 | 9/1994 | Takano et al. | 362/394 |
| 5,357,408 | 10/1994 | Lecznar et al. | 362/74 |

FOREIGN PATENT DOCUMENTS 3612178  10/1987  Germany .

Primary Examiner—Denise L. Gromada
Assistant Examiner—Alfred Basichas
Attorney, Agent, or Firm—Price, Heneveld, Cooper, DeWitt & Litton

[57] ABSTRACT

An electrical vehicle accessory is directly mounted to an aperture in a supporting member base by providing a socket which includes a fastener which mechanically snaps the socket into the support member and, in turn, mechanically and electrically receives a plug of an electrical assembly for holding the assembly in a final installed position.

20 Claims, 3 Drawing Sheets

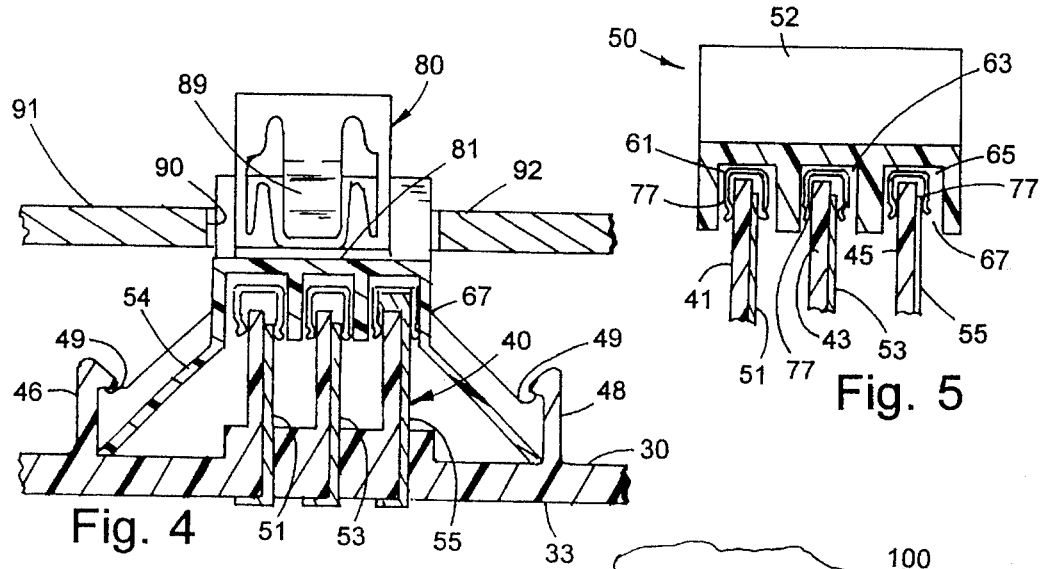
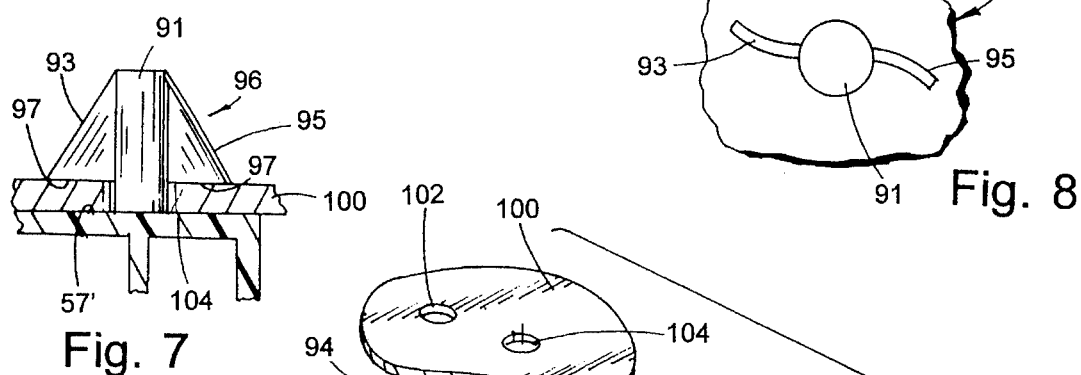
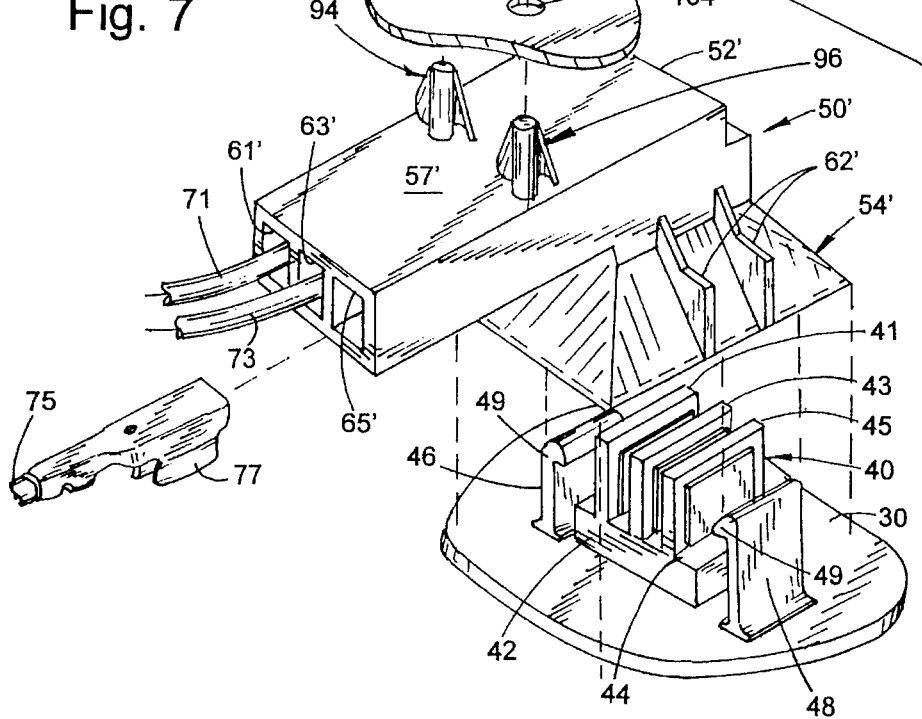

5,546,288

SNAP-IN ELECTRICAL VEHICLE ACCESSORY

BACKGROUND OF THE INVENTION

The present invention relates to the mounting of a vehicle electrical accessory and particularly to a combined mechanical and electrical mount therefor.

The design of modern vehicle accessories is becoming increasingly cognizant of manufacturing efficiency for purposes of cost reduction as well as designs which will be relatively free from defects and yet retain reliability and serviceability where necessary. In order to mount electrical accessories, such as lamp assemblies, to vehicles in the past, typically a mounting base with the necessary electrical sockets were secured directly to the vehicle roof. A bezel was then attached to the base and frequently carried lenses to finish the installation. In recent years, the headliners themselves serve as a carrier for some accessories, if not excessively heavy, so that an integrated headliner could be installed in a vehicle. The installation of a headliner requires roof fasteners, however, at various locations and frequently near roof-mounted accessories. Thus, there remains a need to reduce the complexity and cost of the accessories and their mounting processes, particularly as they pertain to electrically operated overhead vehicle accessories.

One such popular accessory is overhead map reading lamps or courtesy lamps for selectively illuminating the interior of the vehicle. U.S. Pat. No. 4,584,631 discloses a lamp assembly in which a mechanical and electrical connector is included on a lamp housing which plugs into a socket secured to the vehicle roof structure by a housing secured utilizing conventional fastening screws. Thus, although the lamp assembly itself mechanically and electrically connects to the vehicle, it does so utilizing a roof-mounted housing and socket. Other similar mounting arrangements have also been proposed for use in connection with vehicles, however, there remains a need for a system which can both electrically and mechanically attach to a vehicle roof support without requiring a separate base or using the headliner for the sole support in cases of heavy accessories.

SUMMARY OF THE PRESENT INVENTION

The system of the present invention provides for the electrical and mechanical attachment of an electrical vehicle accessory directly to the underlying support member such as a vehicle headliner or other vehicle support by providing a socket which mechanically couples to a vehicle roof, which, in turn, mechanically and electrically receives an electrical assembly for holding the electrical assembly in a final installed position.

In one embodiment of the invention, a lamp assembly is provided with an electrical socket having fastening means for securing the socket directly to a support panel of the vehicle. The lamp assembly includes a housing for receiving lamps which include conductors extending into a plug which mechanically and electrically locks into the socket for securing the lamp housing and lamps therein to the socket, which, in turn, is mounted to the underlying support member. In this embodiment, the socket can be first mechanically attached to the vehicle roof, for example, and subsequently the lamp housing and the plug mechanically and electrically secured to the socket. In some embodiments of the invention the socket may include a separate clip for mechanically securing the socket to the underlying support or may integrally include fasteners for such purpose.

The advantage of the system of the present invention is that it provides for the direct mounting of a lamp housing both mechanically and electrically to a vehicle without requiring additional fasteners by the utilization of a snap-in system in which the housing is both electrically and mechanically installed without separate fasteners or installation steps.

These and other features, objects and advantages of the present invention will become apparent upon reading the following description thereof together with reference to the accompanying drawings.

BRIEF DESCRIPTION OF THE DRAWINGS

FIG. 4 is a cross-sectional view of the assembled mounting system shown in FIG. 3;

FIG. 5 is an enlarged, fragmentary, cross-sectional view of a portion of the structure shown in FIG. 4;

FIG. 6 is an enlarged, fragmentary, perspective and exploded view of an alternative embodiment of the mounting system of the present invention;

FIG. 7 is an enlarged, cross-sectional view of one of the mounting fasteners shown in FIG. 6, shown in an installed position; and FIG. 8 is a top plan view of the fastener shown in FIG. 7.

DETAILED DESCRIPTION OF THE PREFERRED EMBODIMENT

Figure 1:
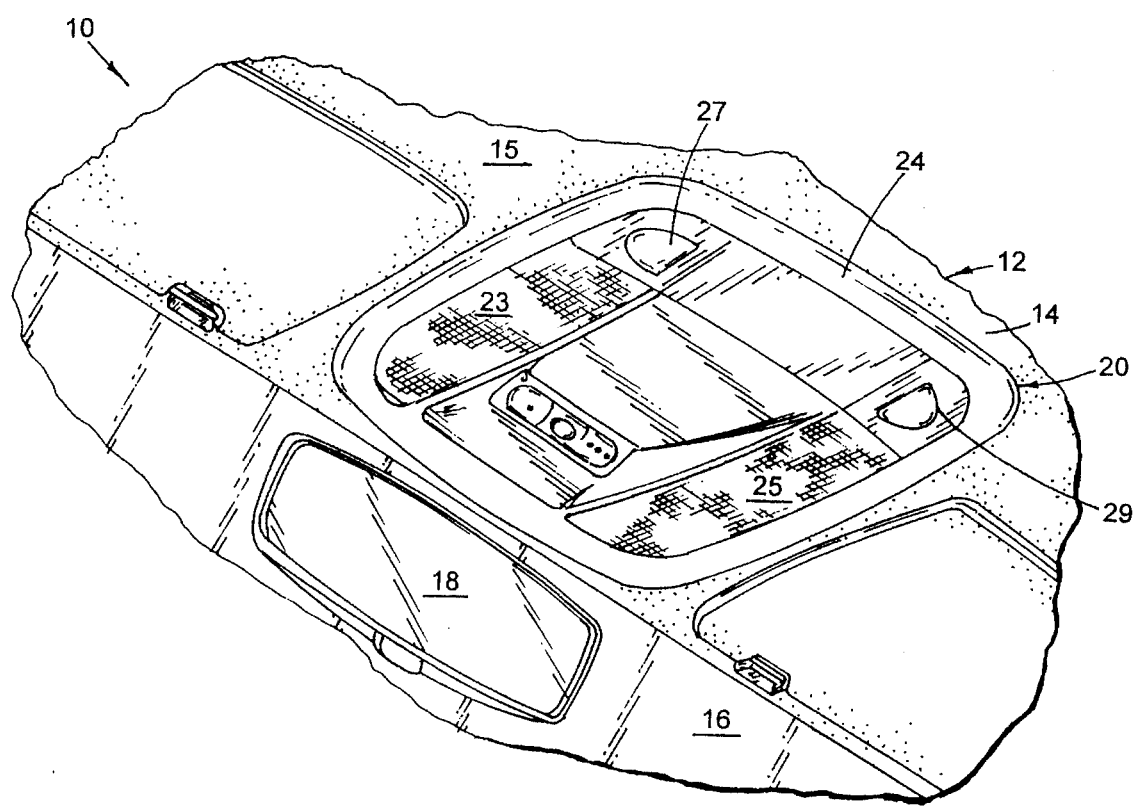
FIG. 1 is a fragmentary, perspective view of a vehicle including an electrical accessory embodying the present invention.
Figure 2:
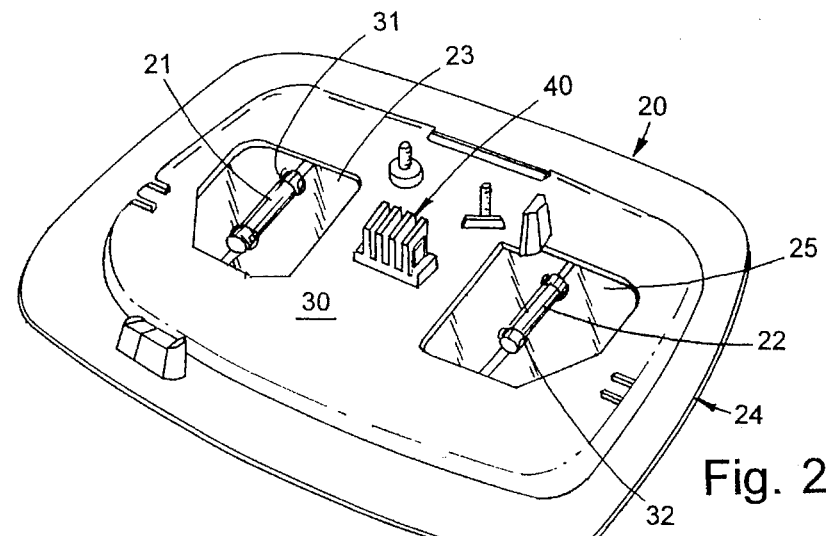
FIG. 2 is a top perspective view of the electrical accessory shown in FIG. 1.

Referring initially to FIG. 1, there is shown a vehicle 10, such as an automobile, which includes a roof 12 to which there is mounted a headliner 14 which can be preformed and molded of a composite material covered with a suitable upholstery material 15 to conform to the decor of the vehicle interior. The headliner extends to just above the windshield 16 to which there may be mounted a rearview mirror assembly 18. An electrical accessory, such as a map lamp assembly 20, is mounted to the roof support structure by means of the unique mounting system of the present invention. The electrical accessory 20 may be a dual map lamp assembly in which a pair of lamps 21, 22 (FIG. 2) are mounted within a housing 24. Housing 24 may be molded of a suitable polymeric material, such as polycarbonate. Lenses 23, 25 extend over the lamps 21, 22, respectively, for directing illumination downwardly toward the driver or passenger side of the vehicle, respectively. Mounted within the exposed surface of housing 24 are a pair of switches 27, 29 for electrically activating lamps 21, 22, respectively.

Figure 3:
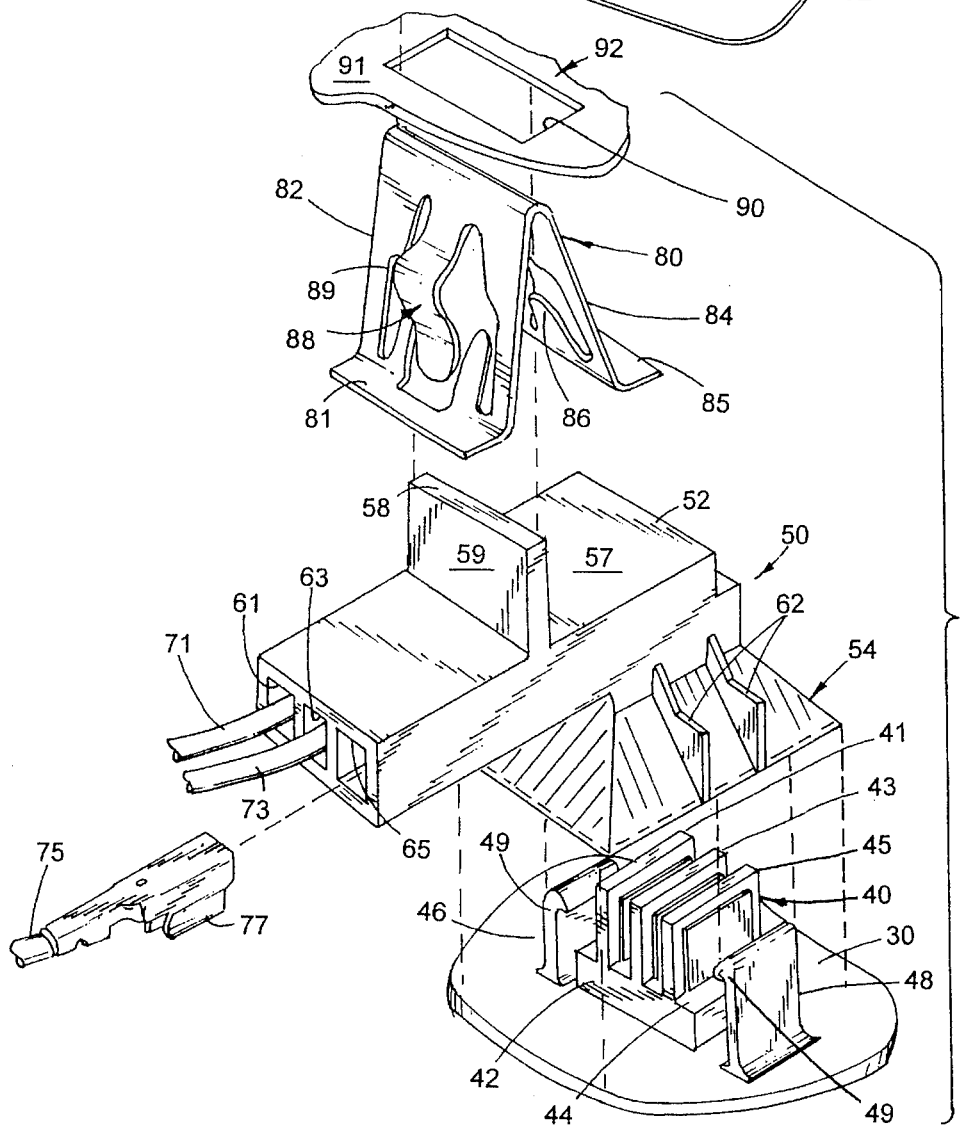
FIG. 3 is an enlarged, fragmentary, perspective and exploded view of the mounting system for the electrical accessory shown in FIGS. 1 and 2.

Lamps 21, 22 are mounted within electrical sockets 31, 32, respectively, which include conductors which extend from opposite terminals of the cartridge-type lamps to a plug 40 integrally extending upwardly from floor 30 of housing 24 for providing a mechanical and electrical coupling of housing 24 to a socket 50 (FIG. 3).

Plug 40 is shown in greater detail in FIGS. 3–5 and includes a rectangular base 42 with three spaced, vertically extending walls 41, 43 and 45 extending from the upper surface 44 of base 42. Three conductors 51, 53 and 55 extend adjacent and are affixed to one side of the vertically extending walls of the plug 40 and extend to the switches 27, 29 and subsequently to the lamp sockets 31, 32 in a conventional manner. Thus, conductor 51 provides a ground conductor, while conductor 53 is coupled to a switch for one of the lamps, and conductor 55 is similarly coupled to the remaining lamp. For such purpose, the conductors 51, 53 and 55 extend through apertures in base 42, as best seen in FIG. 4, to the undersurface 33 of floor 30 and to the switches and lamp sockets. The conductors 51, 53, 55 are coupled to corresponding electrical conductors associated with the vehicle's electrical system comprising conductors 71, 73 and 75, as seen in FIG. 3, through the interconnection of plug 40 with socket 50, such that the conductors 51, 53 and 55 selectively receive electrical operating power for the operation of lamps 21, 22. Plug 40 also includes a pair of locking legs 46 and 48, each of which extend from the floor 30 adjacent base 42 and which each include an inwardly projecting tab 49 for snap-locking onto socket 50 as seen in FIG. 4 and as described in greater detail below.

Socket 50 comprises a body 52 having a conventional horn 54 with outwardly diverging sidewalls for guiding the insertion of plug 40 into the socket 50. The body 52 includes horizontally extending channels 61, 63 and 65 for receiving conductors 71, 73 and 75 therein, respectively, and for aligning connecting terminals 77 at the end of each of the conductors with apertures 67 (FIG. 4) formed in the floor of each of the channels 61, 63 and 65. Apertures 67 are aligned with walls 41, 43 and 45 of the plug 40 such that the walls and their associated conductors extend upwardly through the floor of channels 61, 63 and 65 and interconnect to terminals 77 while compressively gripping each of the respective associated conductors 51, 53 and 55, as best seen in FIG. 5, for providing the electrical interconnection. At the same time, the snap-locking tabs 46, 48 engage horizontally extending flanges 62 on the sidewalls of the horn 54 of socket body 52, as best seen in FIG. 4, for mechanically locking the plug to the socket.

The socket body 52 further includes, in the embodiment shown in FIGS. 1–5, a vertically extending upper wall 58 (FIG. 3) for lockably receiving a spring steel clip 80 having an inverted V-shaped configuration defined by legs 82, 84 terminating in flanges 81, 85, respectively, which rests against the upper surface 57 of socket body 52 when installed. Four spaced, spring-loaded tangs 86 project inwardly and upwardly from side walls 82, 84 and grip the opposite sides 59 of wall 58 for locking spring clip 80 to the socket 50 when pushed downwardly over wall 58. Legs 82, 84 of clip 80 also each include a central spring leg 88 with a center projection 89 which extends outwardly, as seen in FIG. 3. Once installed onto socket 50, clip 80 and socket 50 are snap-fitted into aperture 90 with projection 89 extending over the opposite edges of the apertures. The projections 89 are curved and spaced from flanges 81, 85 such that they provide a continuous comprehensive force holding clip 80 and socket 50 mounted thereto to the support structure 91.

During assembly, the socket 50 can be preassembled with conductors 71, 73 and 75 positioned therein together with the mounting clip 80 and snap-fitted within aperture 90 of the underlying sheet metal roof support 92. Subsequently, the lamp assembly 20 and plug 40 thereof are snap-fitted into the socket 50 to complete the installation. Alternatively, plug 40 and socket 50 can be preassembled with clip 80 and the entire subassembly snap-fitted within aperture 90 of the roof, whichever assembly is more efficient for a given assembly line operation. The result of either such installation is the electrical and mechanical snap-fitting of an electrical accessory, such as the map lamp assembly 20, directly to a roof or other vehicle support member 92 using only snap-in fasteners not requiring separate screws or other fastening devices.

In an alternative embodiment of the invention shown in FIGS. 6–8, plug 40 is of identical construction and can be associated with the same map lamp assembly 20 or other electrical accessory, as shown in the previous embodiment. Socket 50' is also substantially the same as socket 50 shown in the first embodiment with the exception that wall 58 and clip 80 are replaced with a pair of spaced fastening members 94, 96 which integrally extend from the top surface 57' of body 52' and lockably engage spaced apertures 102, 104 in an underlying support member 100, such as a sheet metal roof support structure. Each of the integral fastening members 94, 96 are identical, with member 94 being shown in detail in FIGS. 7 and 8. Fastener 94 has a central cylindrical, vertically extending post 91 integrally including a pair of generally triangular, curved, outwardly and downwardly extending legs 93, 95 each terminating in a horizontal edge 97, spaced a predetermined distance from the top surface 57' of the body 52' of socket 50'. The distance is substantially equal to the thickness of the support member 100 to which the socket 50' is mounted. Edge 97 may be tapered to accommodate thickness tolerances and other mounting variable. The fastening members 94, 96, like socket 50', are made of a suitable polymeric material which is sufficiently resilient to allow the triangular and vertically curved legs 93, 95 to deflect into the circular apertures 102, 104 each having a diameter slightly greater than the diameter of posts 91 such that the legs can be compressibly forced through the apertures and subsequently spring outwardly into the locking position shown in FIGS. 7 and 8 for holding the socket 50' and accessory 20 in place.

It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows.

What is claimed is:

1. A snap-in electrical accessory for a vehicle comprising:
    an electrical socket including electrical terminals mounted therein for receiving an electrical plug, said socket further including locking structure for mechanically locking a plug to said socket;
    a fastener having one end snap-fitted to said socket and legs shaped to be snap-fitted within an aperture of a support structure of a vehicle for snap-in mounting of said socket to the support structure; and
    an electrical assembly including a housing having a plug extending therefrom, said plug including electrical contacts for engaging said terminals of said socket and locking structure for engaging said locking structure of said socket such that said assembly can be electrically and mechanically coupled to said socket by the insertion of said plug into said socket, thereby mounting said housing to a vehicle.

2. The accessory as defined in claim 1 wherein said fastener comprises a generally V-shaped spring clip.

3. The accessory as defined in claim 2 wherein said socket includes a wall which extends into said V-shaped spring clip for attaching said-spring clip to said socket.

4. The accessory as defined in claim 1 wherein said fastener includes at least one integrally formed mounting post including a curved leg and an edge for gripping the support structure when inserted through a mounting aperture thereof.

5. The accessory as defined in claim 4 wherein said fastener includes a pair of spaced mounting posts.

6. The accessory as defined in claim 1 wherein said locking structure of said socket includes one of a ledge and tab and said locking structure of said plug includes the other of said ledge and tab positioned to lockably interengage when said plug is inserted into said socket.

7. The accessory as defined in claim 6 wherein said socket further includes a horn having outwardly divergent sides for guiding said plug therein.

8. A snap-in lamp assembly for a vehicle comprising:

an electrical socket including electrical terminals mounted therein for receiving an electrical plug, said socket further including one of a ledge and tab for mechanically locking the plug thereto once inserted into said socket;

a lamp assembly including a housing, said housing including a plug extending therefrom and having electrical contacts for engaging said terminals of said socket, said plug further including the other of a ledge and tab for engaging said socket such that said lamp assembly is electrically and mechanically coupled to said socket by the insertion of said plug into said socket; and a fastener having one end snap-fitted to said socket and legs shaped to be snap-fitted within an aperture of a support structure of a vehicle for snap-in mounting of said lamp assembly to the support structure.

9. The accessory as defined in claim 8 wherein said fastener comprises a generally V-shaped spring clip.

10. The accessory as defined in claim 9 wherein said socket includes a wall which extends into said V-shaped spring clip for attaching said spring clip to said socket.

11. The accessory as defined in claim 8 wherein said fastener includes at least one integrally formed mounting post including a curved leg and an edge for gripping the support structure when inserted through a mounting aperture thereof.

12. The accessory as defined in claim 11 wherein said fastener includes a pair of spaced mounting posts.

13. The accessory as defined in claim 12 wherein said socket further includes a horn having outwardly divergent sides for guiding said plug therein.

14. A mounting system for mounting an electrical accessory to a vehicle support comprising:

a housing having an electrically actuated accessory and a plug extending therefrom, said plug including a plurality of electrical contacts coupled to said accessory and to said plug for engaging terminals of a socket, said plug further including means for lockably engaging a socket such that said housing can be electrically and mechanically coupled to a socket by the insertion of said plug into a socket;

an electrical socket including electrical terminals mounted therein for receiving said plug and conductors extending from said terminals for connection to a vehicle's electrical system; and a fastener having one end snap-fitted to said socket and legs shaped to be snap-fitted within an aperture of a support structure of a vehicle for snap-in mounting of said socket and housing to the support structure.

15. The accessory as defined in claim 14 wherein said fastener includes at least one integrally formed mounting post including a curved leg and an edge for gripping the support structure when inserted through a mounting aperture thereof.

16. The accessory as defined in claim 15 wherein said fastener includes a pair of spaced mounting posts.

17. The accessory as defined in claim 16 wherein said socket further includes a horn having outwardly divergent sides for guiding said plug therein.

18. The accessory as defined in claim 14 wherein said fastener comprises a generally V-shaped spring clip.

19. The accessory as defined in claim 18 wherein said socket includes a wall which extends into said V-shaped spring clip for attaching said spring clip to said socket.

20. The accessory as defined in claim 19 wherein said accessory is a lamp.

* * * * *